United States Patent [19]

Chenausky et al.

[11] Patent Number: 4,550,410
[45] Date of Patent: Oct. 29, 1985

[54] COUPLED-CAVITY LASER

[75] Inventors: Peter P. Chenausky, Avon; Nelson N. Hoffman, Tolland; Lanny M. Laughman, Bolton, all of Conn.

[73] Assignee: United Technologies Corporation, Hartford, Conn.

[21] Appl. No.: 369,298

[22] Filed: Apr. 16, 1982

[51] Int. Cl.⁴ ............................................. H01S 3/082
[52] U.S. Cl. ..................... 372/97; 372/108; 372/99; 372/20
[58] Field of Search ............. 372/97, 32, 29, 108, 372/99, 98, 20, 64, 19; 350/163

[56] References Cited

U.S. PATENT DOCUMENTS

| | | | |
|---|---|---|---|
| 3,134,837 | 5/1964 | Kisliuk et al. | 372/97 |
| 3,358,243 | 12/1967 | Collins, Jr. et al. | 372/19 |
| 3,422,370 | 1/1969 | Collins, Jr. | 372/20 |
| 3,436,678 | 4/1969 | Sharp et al. | 372/20 |
| 3,961,283 | 6/1976 | Abrams et al. | 372/64 |

OTHER PUBLICATIONS

Boersch et al., "Measurement of Length Shifts Down to $10^{-3}$ Å with a Two-Mode Laser", *Appl. Opt.*, vol. 9, No. 3, Mar., 1970, p. 645.

Boersch et al., "Measurement of Length Shifts Down to $10^{-5}$ Å with a Three-Mode Laser", *IEEE J. Quant. Elect.*, vol. QE-10, No. 6, Jun. 1974.

Peterson et al., "Interferometry and Laser Control with Solid Fabry-Perot Etalons", *Appl. Opt.*, vol. 5, No. 6, Jun. 1966.

Wiesemann, "Longitudinal Mode-Selection in Lasers with Three-Mirror Reflectors", *Appl. Opt.*, vol. 12, No. 12, Dec. 1973.

*Primary Examiner*—William L. Sikes
*Assistant Examiner*—Leon Scott, Jr.
*Attorney, Agent, or Firm*—Eric W. Petraske

[57] ABSTRACT

A laser employs a Fabry-Perot etalon, coupled to an optical cavity, to control either the power or the frequency of the laser substantially independently.

4 Claims, 6 Drawing Figures $R_{114} = .65$
$R_{116} = .97$

COUPLED-CAVITY LASER

The Government has rights in this invention pursuant to Contract No. DAAK80-79-C-0302 awarded by the Department of the Army.

TECHNICAL FIELD

The field of the invention is that of lasers having devices to control the frequency and phase of the laser output.

BACKGROUND ART

It is known to use a coupled cavity together with a cavity containing a gain medium, the coupled cavity being used for the purpose of outcoupling the laser beam and for controlling the laser. Copending application Ser. No. 348,566, assigned to the Assignee of this application, illustrates a laser in which a coupled cavity includes a modulator within the cavity which is used to Q-switch and cavity dump the laser beam. Frequency control of the laser beam is accomplished by using a grating to form one end of the coupled cavity.

DISCLOSURE OF INVENTION

The invention relates to a laser in which a Fabry-Perot etalon is coupled to an optical cavity containing a gain medium, the mirrors of the etalon having a particular relationship in order to control the laser beam.

One feature of the invention includes the selection of the reflectivities of the coupled-cavity mirrors in order to control the outcoupling coefficient of the laser without changing the phase of the laser radiation and, hence, the frequency of the laser beam.

Another feature of the invention is the use of the coupled cavity to control the laser frequency without appreciably changing the reflectivity and, therefore, the outcoupled power of the laser beam.

Another feature of the invention is the use of a movable mirror for frequency control of the laser beam in which the movable mirror is located outside the vacuum envelope which contains the gain medium.

BEST MODE FOR CARRYING OUT THE INVENTION

Figure 2:
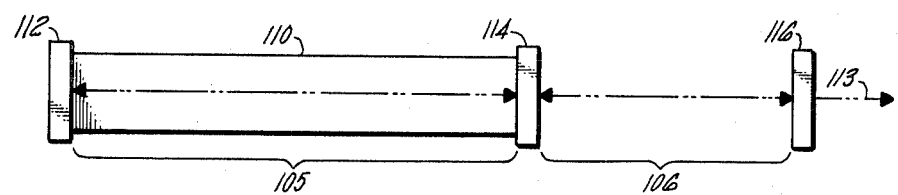
FIG. 2 illustrates schematically a laser according to the invention.

FIG. 2 illustrates a laser having two cavities, a first cavity 105 comprising gain medium 110 and bounded by mirrors 112 and 114 and a coupling cavity 106 bounded by mirrors 114 and 116. In operation, gain medium 110 is pulsed by pulsing means not shown, generating optical radiation which resonates between mirror 112, which has a reflectivity of 100%, and mirror 114 which has a reflectivity $R_{114}$ which is less than 100%. A fraction of the radiation within cavity 105 passes through mirror 114 into coupling cavity 106. Mirrors 114 and 116 which form coupling cavity 106 are known in the art as a Fabry-Perot etalon, the properties of which have been mathematically calculated in *Principles of Optics*, Born and Wolfe, p. 325/f 3rd edition. It is known that the net reflectivity of the etalon and the phase difference of the radiation passing through it can be expressed as a complicated function of the reflectivities of the two mirrors and their spacing. In this particular case, cavity 106 is used to couple radiation out of the gain medium to form an output beam 113 and also to control the frequency of the radiation resonated within cavity 105 by means of the control of the phase of the radiation coupled between the two cavities.

Figure 1:
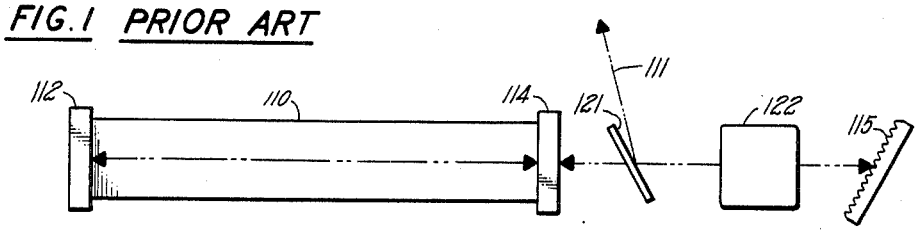
FIG. 1 illustrates schematically a prior art laser.
Figure 3:
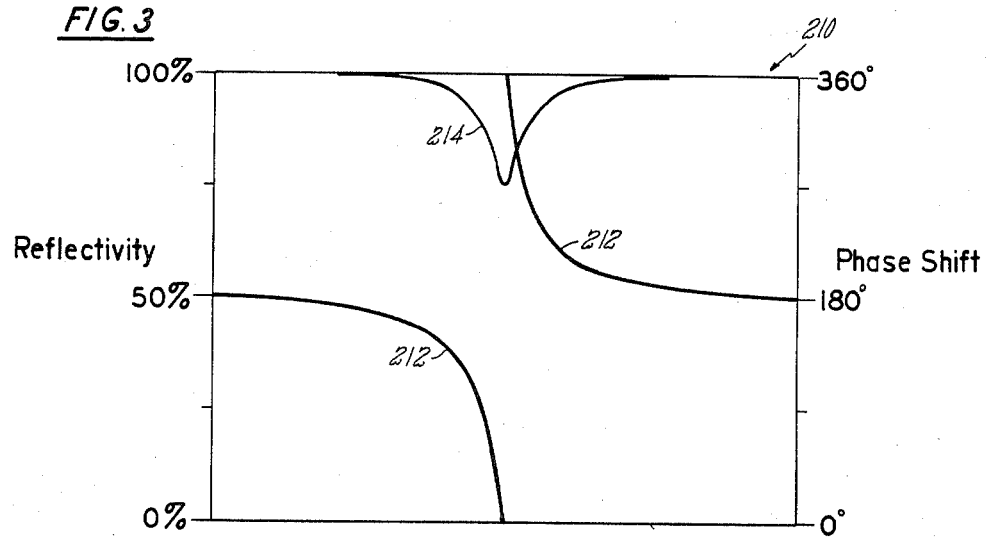
FIG. 3 illustrates a diagram showing the relationship between reflectivity and phase for a prior art laser.

In contrast, a prior art device such as that disclosed in copending U.S. application Ser. No. 348,566, is illustrated in FIG. 1 and has a gain cavity which is the same and a coupling cavity which is formed from mirror 114 and grating 115. This coupling cavity contains electrooptic modulator 122 and Brewster angle plate 121. As disclosed in the copending application, the modulator is used to Q-switch and cavity dump the radiation resonated in the laser to generate output beam 111. The reflectivity of a typical grating is approximately 97%, and this constitutes the end mirror of the coupling cavity. A graph of the relationship between the net reflectivity of the coupling cavity in FIG. 1 is shown in FIG. 3 where the reflectivity is shown as curve 214 and the phase change caused by the etalon is shown as curve 212, as a function of etalon length; assuming a reflectivity of 65% for $R_{114}$ and 97% for grating 115. It should be noted that the phase change $\phi$ changes smoothly until what is called the "notch" region of the reflectivity is reached where the net reflectivity changes very drastically for small changes in mirror spacing. One attempting to use this particular Fabry-Perot etalon for frequency control would find it quite difficult because the phase change $\phi$ is extremely sensitive to small positioning errors between mirror 114 and grating 115. Also, the reflectivity and the phase change (or frequency change) are coupled together so that it may well be that the desirable frequency is associated with an undesirable value of reflectivity.

Figure 4:
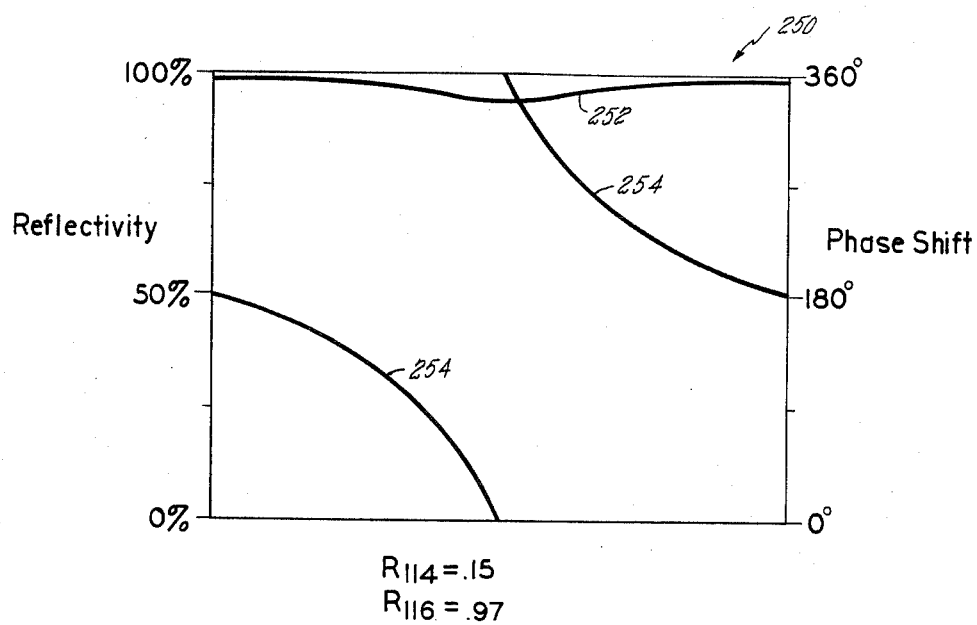
FIG. 4 illustrates the relationship between reflectivity and phase for a laser constructed according to the invention.

A similar set of curves of reflectivity and phase is shown in FIG. 4 for an embodiment of the invention in which the reflectivity $R_{114}$ is 15% and $R_{116}$ is 97%, corresponding to a situation in which a large fraction of the energy within cavity 105 is coupled into cavity 106 and a controlled portion of that energy is coupled out as beam 113. In this case, it can be seem that the change in reflectivity shown as curve 252 in FIG. 4 is quite small and that the change in $\phi$ shown as curve 254 in FIG. 4 is relatively smooth compared to the prior art, so it is possible to have a predictable frequency change and to maintain the frequency quite stably with allowable tolerances for the alignment of the mirrors.

Figure 5:
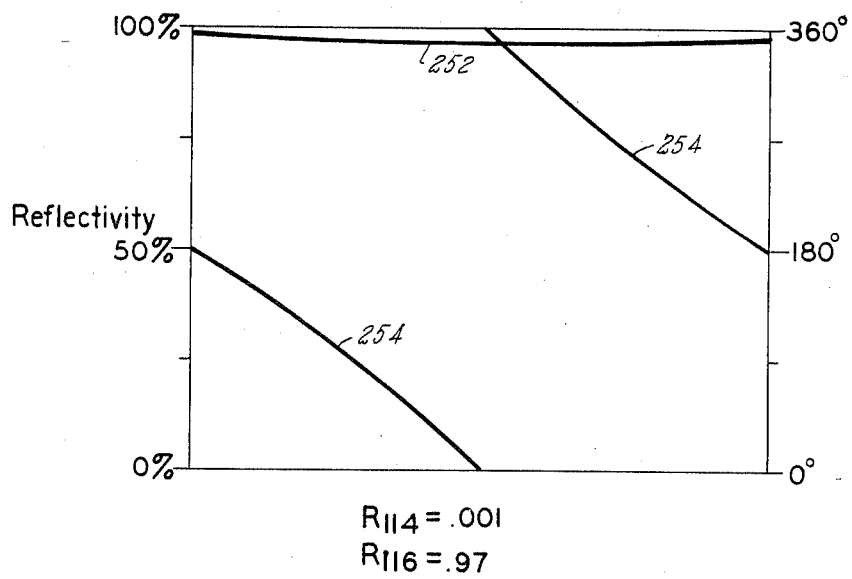
FIG. 5 illustrates the same relationship for a different embodiment of the invention.

FIG. 5 illustrates a similar curve ($R_{114}=0.001$, $R_{116}=0.97$) in which the linearity of the change in phase with distance is improved beyond that of the embodiment of FIG. 4.

Figure 6:
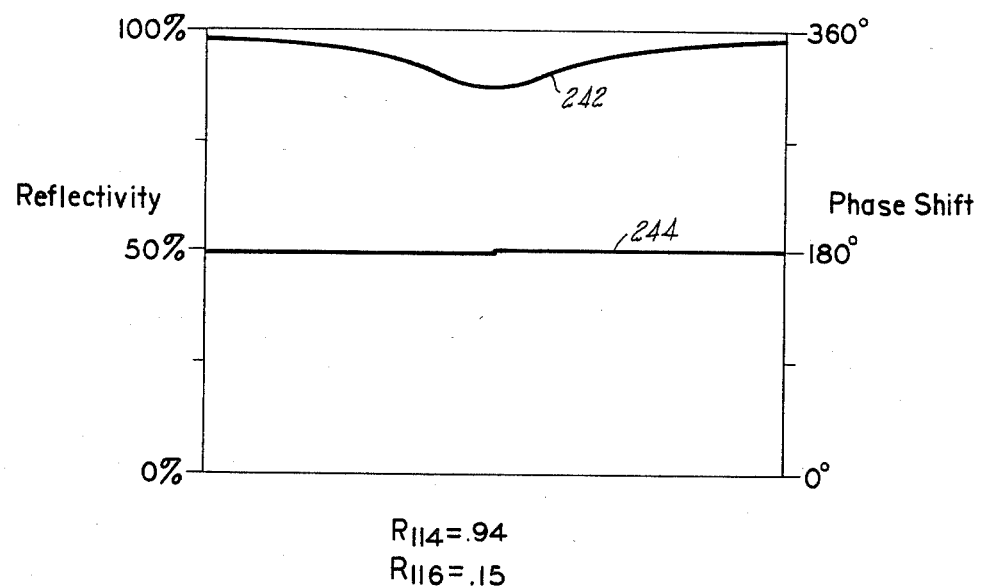
FIG. 6 illustrates the same relationship for a different embodiment of the invention.

FIG. 6 illustrates an embodiment of the invention in which the reflectivity $R_{114}$ is 94% and the reflectivity of $R_{116}$ is 15%, essentially the reverse of the reflectivities of the embodiment of FIG. 4. In this case, the phase change is essentially zero as shown in line 244 and the reflectivity varies by approximately 10% so that a different amount of outcoupled power in beam 13 may be obtained without changing the phase and, therefore, without changing the frequency of that beam.

We claim:

1. A coupled-cavity laser comprising:
a first optical cavity containing a gain medium;
a second optical cavity, having a coupling mirror at a first end of said second optical cavity and an optical element at a second end of said optical cavity opposite said first end of said second optical cavity, coupled to said first optical cavity, and forming a Fabry-Perot etalon having an etalon reflectivity and an etalon phase shift;
in which said etalon cavity is disposed outside said first optical cavity and controls the output power and frequency of the laser, wherein the improvement comprises:
said coupling mirror has a predetermined coupling reflectivity less than 20% and said optical element has an element reflectivity greater than 90%, whereby said etalon phase shift varies as a function of spacing between said coupling mirror and said optical element while said etalon reflectivity is substantially independent of said spacing.

2. A coupled-cavity laser comprising:
a first optical cavity containing a gain medium;
a second optical cavity, having a coupling mirror at a first end of said second optical cavity and an optical element at a second end of said optical cavity opposite first end of said second optical cavity, coupled to said first optical cavity with a predetermined coupling reflectivity, and a forming a Fabry-Perot etalon having an etalon reflectivity and an etalon phase shift;
in which said etalon cavity is disposed outside said first optical cavity and controls the output power and frequency of the laser, wherein the improvement comprises:
said coupling reflectivity is approximately 15%.

3. A coupled-cavity laser comprising:
a first optical cavity containing a gain medium;
a second optical cavity, having a coupling mirror change and an optical element change, coupled to said first optical cavity, and forming a Fabry-Perot etalon having an etalon reflectivity and an etalon phase shift;
in which said etalon cavity is disposed outside said first optical cavity and controls the output power and frequency of the laser, wherein the improvement comprises:
said coupling reflectivity is greater than 90% and said element reflectivity is less than 20%, whereby said etalon reflectivity varies as a function of spacing between said coupling mirror and said optical element while said etalon phase shift is substantially independent of said spacing.

4. A laser according to claim 3, in which said coupling reflectivity is approximately 95% and said element reflectivity is approximately 15%.

* * * * *